United States Patent
Yonehara et al.

(10) Patent No.: US 10,044,071 B2
(45) Date of Patent: Aug. 7, 2018

(54) NONAQUEOUS ELECTROLYTE SECONDARY BATTERY AND METHOD FOR MANUFACTURING SAME

(71) Applicants: Automotive Energy Supply Corporation, Zama-shi, Kanagawa (JP); NISSAN MOTOR CO., LTD., Yokohama-shi, Kanagawa (JP)

(72) Inventors: Sayaka Yonehara, Zama (JP); Keisuke Matsumoto, Zama (JP); Takashi Honda, Zama (JP); Kousuke Hagiyama, Yokohama (JP); Fumihiro Kawamura, Yokosuka (JP); Osamu Shimamura, Yokohama (JP); Kazuki Miyatake, Yokohama (JP); Ikuma Matsuzaki, Yokohama (JP); Ryuuta Yamaguchi, Yokohama (JP); Kuniharu Nomoto, Yokohama (JP)

(73) Assignees: AUTOMOTIVE ENERGY SUPPLY CORPORATION, Zama-shi (JP); NISSAN MOTOR CO., LTD., Yokohama-shi (JP)

( * ) Notice: Subject to any disclaimer, the term of this patent is extended or adjusted under 35 U.S.C. 154(b) by 202 days.

(21) Appl. No.: 15/024,068

(22) PCT Filed: Jun. 9, 2014

(86) PCT No.: PCT/JP2014/065178
§ 371 (c)(1),
(2) Date: Mar. 23, 2016

(87) PCT Pub. No.: WO2015/045493
PCT Pub. Date: Apr. 2, 2015

(65) Prior Publication Data
US 2016/0218398 A1 Jul. 28, 2016

(30) Foreign Application Priority Data
Sep. 27, 2013 (JP) ................................. 2013-202446

(51) Int. Cl.
*H01M 10/42* (2006.01)
*H01M 10/0585* (2010.01)
(Continued)

(52) U.S. Cl.
CPC ... *H01M 10/4235* (2013.01); *H01M 10/0525* (2013.01); *H01M 10/0567* (2013.01); *H01M 10/0585* (2013.01); *H01M 10/446* (2013.01)

(58) Field of Classification Search
CPC ........ H01M 10/4235; H01M 10/0525; H01M 10/0567; H01M 10/0585; H01M 10/446
See application file for complete search history.

(56) References Cited

U.S. PATENT DOCUMENTS

2013/0337305 A1  12/2013  Nagai et al.

FOREIGN PATENT DOCUMENTS

| JP | 2000-306602 A | 11/2000 |
| JP | 2001-35523 A | 2/2001 |

(Continued)

OTHER PUBLICATIONS

Peng Tan et al., Prediction of the Theoretical Capacity of Non-Aqueous Lithium-Air Batteries, Applied Energy 109, Apr. 30, 2013, pp. 275-282.

(Continued)

*Primary Examiner* — Oi K Conley
(74) *Attorney, Agent, or Firm* — Foley & Lardner LLP

(57) ABSTRACT

The present invention provides a non-aqueous electrolyte secondary battery with various improved battery characteristics and a method for manufacturing such a non-aqueous electrolyte secondary battery. In the present invention, the battery manufacturing method includes accommodating and sealing a flat battery element (4) in which a positive electrode plate (41) and a negative electrode plate (42) stacked together via a separator (43), together with a non-aqueous (Continued)

electrolyte including a surplus electrolyte and at least one kind of electrolyte additive, in a laminate film exterior member (5), and then, subjecting the thus-assembled battery (1) to charging operation including at least initial charging in a state where a pressure is applied to a flat surface of the battery element from the outside of the exterior member (5).

3 Claims, 3 Drawing Sheets

(51) Int. Cl.
    *H01M 10/0525* (2010.01)
    *H01M 10/44* (2006.01)
    *H01M 10/0567* (2010.01)

(56) References Cited

FOREIGN PATENT DOCUMENTS

| | | |
|---|---|---|
| JP | 2002-216849 A | 8/2002 |
| JP | 2006-351338 A | 12/2006 |
| JP | 2011-23221 A | 2/2011 |
| WO | WO 2012/117557 A1 | 9/2012 |

OTHER PUBLICATIONS

L. EL Ouatani et al., The Effect of Vinylene Carbonate Additive on Surface Film Formation on Both Electrodes in Li-Ion Batteries, Journal of the Electrochemical Society, 156 (2), Dec. 3, 2008, pp. A103-A113.
Chinese Office Action, dated Apr. 1, 2017, 6 pages.

NONAQUEOUS ELECTROLYTE SECONDARY BATTERY AND METHOD FOR MANUFACTURING SAME

FIELD OF THE INVENTION

The present invention relates to a flat non-aqueous electrolyte secondary battery using a film-like exterior member and a method for manufacturing such a non-aqueous electrolyte secondary battery.

BACKGROUND ART

There is known a flat non-aqueous electrolyte secondary battery such as lithium-ion secondary battery that utilizes a laminate film of a synthetic resin layer and a metal layer as an exterior member so as to accommodate, together with an electrolyte containing a lithium salt etc. (more specifically, a non-aqueous electrolyte having dissolved therein a lithium salt etc.), a battery element in which a plurality of positive and negative electrode plates are formed using lithium composite oxide and carbon material (e.g. graphite) etc. as active materials, respectively, and stacked together via separators.

For the manufacturing of the battery, the battery is subjected to charging operation such as initial charging. During the charging, a strong reducing power (i.e. reducing power that can cause reduction and decomposition of the electrolyte) is generated at the negative electrode plate. The electrolyte is reduced and decomposed under the action of such a reducing power; thereby forming and adhering a coating film onto an active surface of the active material of the negative electrode plate (hereinafter referred to as "negative electrode active material") (such that the active surface of the negative electrode active material is covered by the coating film). The reduction and decomposition of the electrolyte can be suppressed by the formation of the coating film. Namely, the coating film performs the function of improving various battery characteristics by suppressing the reduction and decomposition of the electrolyte.

Researches have thus been made to form a coating film with better quality, rather than to simply form a coating film by reduction and decomposition of the electrolyte (hereinafter referred to as "electrolyte-derived coating film"), for the purpose of improvements of various battery characteristics. For instance, there is known a technique to add an electrolyte additive (such as vinylene carbonate) to the electrolyte in advance of the charging operation of the battery such that the additive is reduced and decomposed to form a desired coating film (hereinafter referred to as "additive-derived coating film) on the active surface of the negative electrode active material (see e.g. Patent Document 1).

PRIOR ART DOCUMENTS

Patent Document

Patent Document 1: Japanese Laid-Open Patent Publication No. 2000-306602

SUMMARY OF THE INVENTION

It is however conceivable that, even in the case where the additive-derived coating film is formed on the active surface of the negative electrode active material, a new active surface is developed by expansion of the negative electrode active material (i.e. a crack occurs in the additive-derived coating film by expansion of the active surface such that a new active surface appears through the crack) during the charging operation. The development of such a new active surface is not assumed in Patent Document 1. It is considered that it has been difficult to improve various battery characteristics due to the fact that, in many cases, most of the additive is consumed by the reduction and decomposition of the electrolyte (almost no additive remains in the electrolyte) before the expansion of the negative electrode active material so that the additive-derived coating film cannot be formed on the new active surface.

The present invention has been made in view of this technical problem. It is an object of the present invention to provide a non-aqueous electrolyte secondary battery having various improved battery characteristics and a method for manufacturing such a non-aqueous electrolyte secondary battery.

As a solution to the above problem, one aspect of the present invention is a manufacturing method of a non-aqueous electrolyte secondary battery, comprising: assembling the non-aqueous electrolyte secondary battery by accommodating a flat battery element together with a non-aqueous electrolyte and at least one kind of electrolyte additive in a film-like exterior member, the battery element having a positive electrode plate and a negative electrode plate stacked together via a separator, the non-aqueous electrolyte including a surplus electrolyte; and, in a state where a pressure is applied to a flat surface of the battery element from the outside of the exterior member, subjecting the non-aqueous electrolyte secondary battery to charging operation including at least initial charging.

Another aspect of the present invention is a non-aqueous electrolyte secondary battery comprising: a battery element having a positive electrode plate and a negative electrode plate stacked together via a separator; a non-aqueous electrolyte including a surplus electrolyte; at least one kind of electrolyte additive; and a film-like exterior member sealed to accommodate therein the battery element together with the non-aqueous electrolyte and the electrolyte additive, with terminals being led out from the exterior member, the non-aqueous electrolyte secondary battery having been subjected to charging operation including at least initial charging, wherein an amount of the electrolyte additive remaining in the non-aqueous electrolyte after the charging operation is 3000 ppm or more; and wherein an amount of the non-aqueous electrolyte used is 1.1 to 1.6 times as much as a pore volume of the battery element.

Effects of the Invention

It is possible to improve various battery characteristics by the non-aqueous electrolyte secondary battery and its manufacturing method according to the present invention.

DESCRIPTION OF EMBODIMENTS

<Battery Configuration Example>

Figure 1:
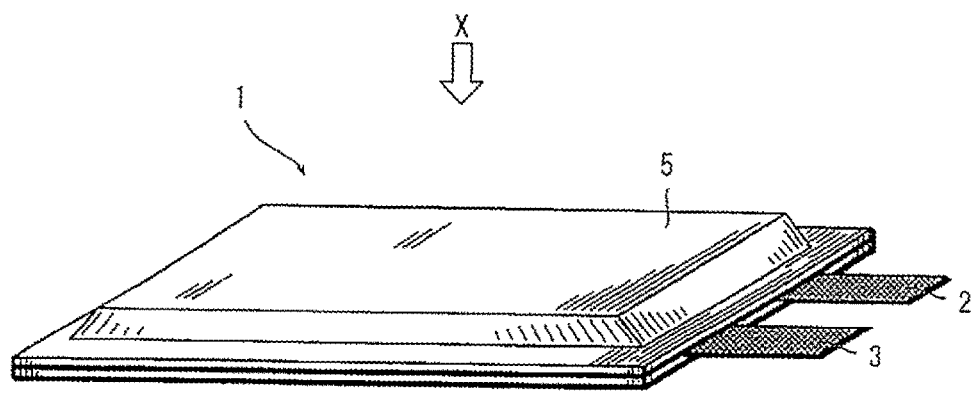
FIG. 1 is a schematic perspective view of a non-aqueous electrolyte secondary battery according to one embodiment of the present invention.
Figure 2:
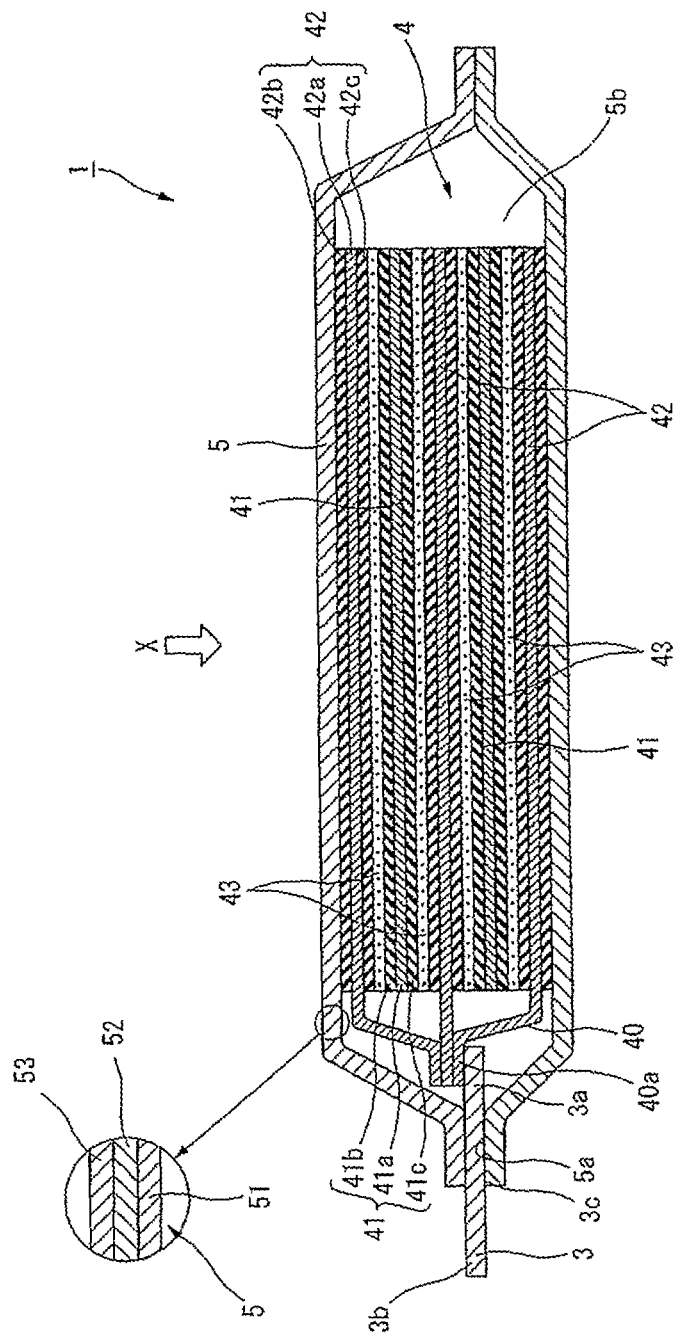
FIG. 2 is a schematic cross-section view of the non-aqueous electrolyte secondary battery of FIG. 1.

As shown in FIGS. 1 and 2, a non-aqueous electrolyte secondary battery 1 (hereinafter simply referred to as "battery") according to one embodiment of the present invention has a flat rectangular appearance with a pair of terminals 2 and 3 provided on a longitudinal end thereof.

The battery 1 includes a battery element 4, which is rectangular in shape as viewed in the direction of arrow X (i.e. as viewed from the flat surface side), and an exterior member 5 formed from two sheets of laminate film so as to accommodate therein the battery element together with an electrolyte (omitted in the drawing) as shown in FIG. 2. The battery element 4 has a plurality of positive electrode plates 41 and negative electrode plates 42 alternately stacked together via separators 43. In the present embodiment, for example, the battery element 4 has three negative electrode plates 42, two positive electrode plates 41 and four separators 43 respectively arranged between the negative electrode plates and the positive electrode plates. Namely, the negative electrode plates 42 are located as outermost layers of the battery element 4 in the present embodiment. The battery element 4 may alternatively be configured such that the positive electrode plates 41 are located as outermost layers of the battery element 4. It is herein noted that, in FIG. 2, the dimensions of the respective parts and portions may not always be accurate and may be exaggerated for purposes of illustration.

Each of the positive electrode plates 41 has a positive electrode collector 41a, which is substantially rectangular in shape as viewed in the direction of arrow X in FIGS. 1 and 2, and positive electrode active material layers 41b and 41c provided on respective main surfaces of the positive electrode collector 41a. The positive electrode collector 41a is formed of e.g. an electrochemically stable metal foil such as aluminum foil, aluminum alloy foil, copper foil or nickel foil. The positive electrode active material layers 41b and 41c are formed by mixing a lithium composite oxide such as lithium nickel oxide ($LiNiO_2$), lithium manganese oxide ($LiMnO_2$), spinel lithium manganese oxide ($LiMn_2O_4$) or lithium cobalt oxide ($LiCoO_2$) as a positive electrode active material with a binder and applying the resulting mixture to the main surfaces of the positive electrode collector 41a. A transition metal element (Ni, Mn, Co) of the lithium composite oxide may be partly replaced by the other element such as Li, Mg, B, Al, V, Cr, Fe, Co, Ni, Mn, W or Ti. A carbon material such as acetylene black, carbon black, graphite or carbon fibers may be added as a conductive aid to the positive electrode active material layer.

Each of the negative electrode plates 42 has a negative electrode collector 42a, which is substantially rectangular in shape as viewed in the direction of arrow X in FIGS. 1 and 2, and negative electrode active material layers 42b and 42c provided on respective main surfaces of the negative electrode collector 42a. The negative electrode collector 42a is formed of e.g. an electrochemically stable metal foil such as copper foil, stainless foil or iron foil. The negative electrode active material layers 42b and 42c are formed by mixing a lithium ion-absorbing/desorbing negative electrode active material such as amorphous carbon, easily graphitizable carbon, hardly graphitizable carbon or amorphous carbon-coated graphite with a binder and applying the resulting mixture to the main surfaces of the negative electrode collector 42a.

Preferably, the negative electrode active material has a particle size of 0.1 to 90 mm and a BET specific surface area of 0.1 to 10 $m^2/g$. As the binder, there can be used polytetrafluoroethylene, polyvinylidene fluoride, carboxymethylcellulose, styrene-butadiene rubber or the like. A carbon material such as acetylene black, carbon black, graphite or carbon fibers may be added as a conductive aid to the negative electrode active material layer.

A longitudinal end part of the negative electrode collector 42a extends as an extension part 40 without the negative electrode active material layers 42b and 42c being provided thereon. A terminal end portion 40a of the extension part 40 is joined to one end portion 3a of the negative electrode terminal 3a inside the exterior member 5. In the case of a plurality of negative electrode collectors 42a, the terminal end portions 40a of the respective extension parts 40 of the negative electrode collectors 42a are combined together and then joined to the end portion 3a of the negative electrode terminal 3.

In this joining, it is feasible to establish a contact joint between the end portion 40a of the extension part 40 and the end portion 3a of the negative electrode terminal 3a by e.g. an ultrasonic bonding technique (using an ultrasonic horn in contact with the end portion 40a). Although not specifically shown in FIG. 2, a longitudinal end part of the positive electrode collector 41a also extends as an extension part (as in the case of the extension part 40; omitted in the drawing) without the positive electrode active material layers 41b and 41c being provided thereon; and a terminal end portion of the extension part of the positive electrode collector is joined to one end portion of the positive electrode terminal 2 inside the exterior member 5.

Each of the separators 43 performs the function of not only preventing a short circuit between the positive electrode plate 41 and the negative electrode plate 42 but also holding therein the electrolyte. The separator 43 is formed of e.g. a fine porous film of polyolefin such as polyethylene (PE) or polypropylene (PP). The separator 43 is not however limited to such a single-layer film of polyolefin and may be in the form of a multilayer film having e.g. a three-layer structure in which a polypropylene film is sandwiched between polyethylene films or a laminated structure in which a polyolefin fine porous film is laminated on an organic non-woven fabric. Alternatively, the separator 43 may be in the form of a polyolefin fine porous film having adhered to one or both sides thereof, or dispersed therein, inorganic particles of silica, alumina, magnesia, zirconia, titania etc. or a polyolefin fine porous film having adhered to one or both sides thereof porous films or particles of heat-resistant resin. For adhesion of the above particles to the porous film, there can be used the same binder as those mentioned in the above explanations of the positive and negative electrodes.

There is no particular limitation on the material of the exterior member 5 as long as the exterior member 5 is in film form such that the battery element 4 in which the electrodes are stacked together via the separators is accommodated together with the electrolyte in the exterior member 5. As shown in the enlarged illustration of FIG. 2, the laminate film of the exterior member 5 has e.g. a three-layer structure formed with a thermal fusion layer 51, a metal layer 52 and a protection layer 53 in the present embodiment. The metal layer 52 is formed of e.g. an aluminum foil as an intermediate layer. The thermal fusion layer 51 is formed of e.g. a thermally fusible synthesis resin such as polypropylene (PP) co as to cover an inner surface of the metal layer 52. The protection layer 52 is formed of e.g. a highly durable synthetic resin such as polyethylene terephthalate (PET) so as to cover an outer surface of the metal layer 52. There can alternatively be used a laminate film having four or more layers. Although the synthetic resin layers are provided on both surfaces of the metal layer 52 as mentioned above in the present embodiment, it is not necessarily essential to provide the synthetic resin layer on the outer side of the metal layer 52. The synthetic resin layer may be provided only on the inner side of the metal layer 52. Preferably, the laminate film has a total thickness of 0.05 to 0.8 mm.

The exterior member 5 has a double structure consisting of one laminate film sheet arranged on the lower surface of the battery element 4 and another laminate film sheet arranged on the upper surface of the battery element 4 as shown in FIG. 2. In this case, four peripheral sides of these two laminate film sheets are overlaid and thermally fusion bonded to each other. Although the double-structure exterior member 5 is shown as the illustrated example, the exterior member 5 may alternatively be formed by folding a single, relatively large laminate film into two, placing the battery element 4 in the folded laminate film, and then, overlaying and thermally fusion bonding three peripheral sides of the laminate film to each other.

At the time of thermally fusing bonding the laminate film sheets of the exterior member 5, one end portions of the terminals 2 and 3 (e.g. the end portion 3a of the negative electrode terminal 3) are joined to the extension parts of the collectors 41a and 42a (e.g. the extension parts 40 of the collectors 42a) within the inside of the exterior member 5; whereas the other end portions of the terminals 2 and 3 (e.g. the end portion 3b of the negative electrode terminal 3) are led to the outside from the short side of the rectangular battery 1 through between joint surfaces 5a of the laminate film sheets. Parts of the terminals 2 and 3 between the one end portions and the other end portions (e.g. the part of the negative electrode terminal 3 between the end portions 3a and 3b) are sandwiched between and thermally fused to the joint surfaces 5a of the laminate film sheets.

The distance between the thermal fusion part and the battery element is preferably in the range of e.g. 1 to 25 mm in a state where the inside of the exterior member is depressurized. When the distance between the thermal fusion part and the battery element is smaller than 1 mm, the electrolyte cannot be accumulated while being sufficiently separated from the electrode. When the distance between the thermal fusion part and the battery element exceeds 25 mm, an additive in the accumulated electrolyte can hardly return to the electrode even during long-term use so that it becomes difficult to obtain the effects of the present invention.

<Example of Electrolyte>

There is no particular limitation on the kind of the electrolyte used. As the electrolyte, there can be used any common electrolyte material for lithium-ion secondary batteries, such as non-aqueous electrolyte in which a lithium salt is dissolved in an organic solvent. For example, the organic solvent is one kind, or two or more kinds in combination, selected from propylene carbonate, ethylene carbonate, dimethyl carbonate, diethyl carbonate, ethyl methyl carbonate and the like. The lithium salt is preferably any one or more selected from $LiPF_6$, $LiBF_4$, $LiCF_3SO_3$, $LiC_4F_9SO_3$, $LiN(CF_3SO_2)_2$, $LiC(CF_3SO_2)_3$ and the like.

The electrolyte includes a surplus electrolyte. The amount of the surplus electrolyte is determined by subtracting the sum of the volume of pores in the positive electrodes, the volume of pores in the negative electrodes and the volume of pores in the separators (hereinafter referred to as the "pore volume of the battery element") from the total volume of all the electrolyte present within the exterior member. When this amount value is positive, the ratio of the total amount of the electrolyte to the pore volume of the battery element exceeds 1. It suffices in the present invention that the total amount of the electrolyte is 1 times or more as much as the sum of the volume of pores in the electrodes 41 and 42 and the volume of pores in the separators 43 (i.e. the pore volume of the battery element 4). The total amount of the electrolyte used is preferably 1.1 to 1.6 times, more preferably 1.2 to 1.6 times, as much as the pore volume of the battery element. When a pressure is applied to the flat surface of the battery element from the outside of the exterior member in a state where the electrolyte including the surplus electrolyte is accommodated within the exterior member 5, the surplus electrolyte is shifted (e.g. in a direction perpendicular to the stacking direction of the electrodes etc. of the battery element 4) and accumulated into an inner peripheral space 5b of the exterior member 5 around the battery element 4 so that it is possible to enhance the effects of the present invention.

<Example of Additive>

There is no particular limitation on the kind of the additive used as long as the additive can be reduced and decomposed on the negative electrode active material (in FIG. 2, the negative electrode active material layers 42b and 42c) to form an additive-derived coating film on an active surface of the negative electrode active material. Various kinds of additives are usable. Examples of the additive are: carbonates such as vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate (VEC) and divinylethylene carbonate; compounds each obtained by replacing parts of hydrogen atoms of the carbonates with fluorine atoms; sultones such as propanesultone; chain or cyclic sulfonic acid esters; and chain or cyclic disulfonic acid esters. Among others, vinylene carbonate, vinylethylene carbonate, divinylethylene carbonate, sultone and fluoroethylene carbonate are preferred. These additives can be used solely or in combination of two or more thereof.

It suffices to use the additive in such an amount that some of the additive remains in the exterior member 5 after the battery has been subjected to charging operation (more specifically, at least initial charging) under the application of pressure. Preferably, the amount of the additive in the electrolyte is 1 wt % to 7 wt %. When the amount of the additive is in this range, it is favorably possible to allow e.g. 3000 ppm or more of the additive to remain in the electrolyte after the charging operation (i.e. at the time of shipment) and, even if the negative electrode active material expands to develop a new active surface during the subsequent charging operation, sufficiently form an additive-derived coating film on the expansion-developed active surface such that the expansion-developed active surface will not be exposed.

<Examples of Manufacturing Procedure and Charging Operation>

The battery 1 can be produced by the following procedure. First, the battery element 4 is produced by alternately stacking the negative electrode plates 42, the separators 43 and the positive electrode plates 41. The inner end portion (one end portion 3a) of the negative electrode terminal 3 is joined to the extension parts 40 of the negative electrode collectors 42a of the negative electrode plates 42. Similarly, the inner end portion of the positive electrode terminal 2 (as corresponding to the one end portion 3a of the negative electrode terminal 3) is joined to the extension parts 40 of the positive electrode collectors 41a of the positive electrode plates 41. While the battery element 4 is covered by the laminate film of the exterior member 5, four peripheral sides of the laminate film sheets (in the case of folding the laminate film into two, three peripheral sides of the folded laminate film) are bonded together by thermal fusion bonding with a relatively small injection port remaining open. Then, the electrolyte including the surplus electrolyte is injected, together with at least one kind of additive, into the inside of the exterior member 5 through the injection port. The inside of the exterior member is depressurized. After that, the exterior member 5 is sealed by thermally fusing the injection port. By this, the battery 1 is assembled.

Next, the assembled battery 1 is set in a pressure application means (such as pressing holder). The pressure application means is operated to press the battery 1 in the thickness direction from the outside of the exterior member 5 and thereby apply a pressure to the flat surface of the battery element. Then, the surplus electrolyte is shifted to and accumulated in the inner peripheral space 5b of the exterior member 5 around the battery element 4. In this state, the battery is subjected to charging operation including at least initial charging with the application of a voltage through the terminals 2 and 3 under predetermined conditions. During the charging operation, the additive in the accumulated electrolyte between the electrodes of the battery element 4 is reduced and decomposed to form an additive-derived coating film on the surface of the negative electrode active material of the negative electrode active material layers 42b. The initial charging refers to first charging and thus can be performed for the first time after the injection of the electrolyte by, for example, passing a constant current in a charging direction of the battery until the battery is charged to a predetermined voltage level within a battery working voltage range, passing a current until the battery is charged to a maximum voltage level within a battery working voltage range, or passing a varying current such that the change of the voltage of the battery increases in a stepwise manner. It is feasible to temporarily stop the passage of current during the initial charging.

When the battery 1 is detached from the pressure application means and released from the applied pressure, the surplus electrolyte is shifted from the peripheral space 5b to e.g. between the electrodes of the battery element 4. It is thus assumed that, even if the negative electrode active material expands to develop a new active surface during the subsequent charging operation (after the at least initial charging) of the battery 1, the additive in the surplus electrolyte is reduced and decomposed to adhere and form an additive-derived coating film onto the expansion-developed active surface so that it is possible to obtain the effects of the present invention.

Figure 3:
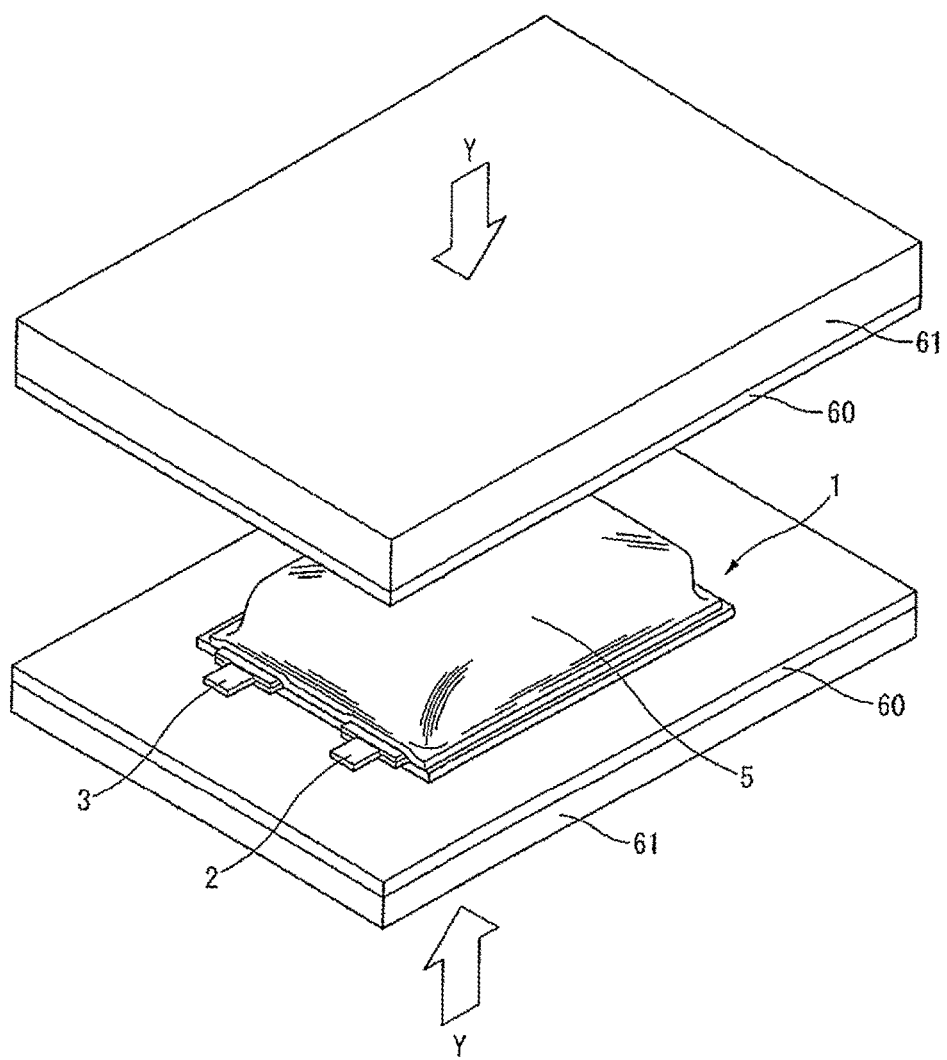
FIG. 3 is a schematic perspective view showing an example of pressure application means to apply a pressure to the battery.

There is no particular limitation on the pressure application means as long as the pressure application means is capable of applying a pressure to the battery from the outside of the exterior member 5 without causing damage to the battery element 4 and to the exterior member 5. It suffices that the pressure application means applies a pressure so as to shift and accumulate the surplus electrolyte in the inner peripheral space 5b of the exterior member 5. The pressure application means can be provided in various forms. One example of the pressure application means is an uniaxial press means that applies a pressure by pressing two press plates 61, each of which is coated with a cushioning material 60, against the exterior member 5 in a thickness direction of the exterior member 5 (i.e. in the direction of arrow Y) as shown in FIG. 3. As the cushioning material 60, there can be used an elastic polymer material such as silicon rubber or fabric material. As the press plates 61, there can be used insulating solid plates such as metal plates e.g. stainless steel plates, glass plates, resin plates or ceramic plates.

In the case of the battery 1 as shown in FIGS. 1 and 2, the applied pressure is preferably in the range of about $0.49 \times 10^{-2}$ MPa (0.05 kgf/cm$^2$) to $24.5 \times 10^{-2}$ MPa (2.5 kgf/cm$^2$) such that the battery 1 can be pressed from the outside of the exterior member 5 without causing damage to the battery element 4 and to the exterior member 5. When the applied pressure is in this range, the ratio of the thickness of the battery to the thickness of the battery element in the stacking direction (hereinafter referred to as "thickness ratio") as pressed by the applied pressure from the outside of the exterior member 5 is about 1.02 to 1.07. It is possible to more enhance the effects of the present invention by controlling the applied pressure and thickness as above. Herein, the denominator of the thickness ratio is the initial thickness of the battery element itself in a state where the electrolyte is not contained in the battery element; and the numerator of the thickness ratio is the outer thickness of the battery (including the thickness of the exterior member) in a state the battery element is accommodated together with the electrolyte in the exterior member. For example, there a tendency that the larger the amount of the surplus electrolyte, the larger the thickness ratio as the spacing between the positive and negative electrode plates and the separators is increased when the electrolyte is excessively contained in the battery element.

The pressure can be applied only during the initial charging or can be also applied during the charging operation subsequent to the initial charging. It is preferable to apply the pressure as appropriate in view of the timing of appearance of the expansion-developed active surface on the negative electrode active material.

As mentioned above, it is possible in the present embodiment to improve the various characteristics of the battery by accommodating the flat battery element in which the positive and negative electrode plates are alternately stacked via the separator, together with the non-aqueous electrolyte including the surplus electrolyte and at least one kind of electrolyte additive in the laminate film exterior member in which the resin layer is laminated on at least the inner side of the metal layer, and then, subjecting the thus-assembled battery to charging operation including at least initial charging while applying a pressure to the flat surface of the battery element from the outside of the exterior member. Alternatively, the non-aqueous electrolyte secondary battery may be manufactured by accommodating the battery element in which the positive and negative electrode plates are alternately stacked via the separator, together with the non-aqueous electrolyte including the surplus electrolyte and at least one kind of electrolyte additive, in the laminate film exterior member in which the resin layer is laminated on at least the inner side of the metal layer, sealing the exterior member with the terminals being led out from the exterior member, and then, subjecting the thus-assembled battery to charging operation including at least initial charging, wherein the amount of the electrolyte additive remaining in the non-aqueous electrolyte after the charging operation is 3000 ppm or more; and wherein the amount of the non-aqueous electrolyte used is 1.1 to 1.6 times as much as the pore volume of the battery element. It is also possible even in this case to improve the various characteristics of the battery.

Although the reason for the above is not clear, it is assumed that the following effects can be obtained. When the initial charging is performed with the application of pressure to the flat surface of the battery element from the outside of the exterior member, the surplus electrolyte is shifted (e.g. in the direction perpendicular to the stacking direction of the electrodes etc. of the battery element) and accumulated into the peripheral space around the battery element. As the surplus electrolyte is kept separated from the electrodes, the additive in the surplus electrolyte is prevented from reduction and decomposition during the initial charging. When the battery is released from the applied pressure, the surplus electrolyte accumulated in the peripheral space around the battery element is shifted to e.g. the electrodes of the battery element. It is thus possible that, even if a new expansion-developed active surface appears on the negative electrode active material e.g. during the subsequent charging/discharging operation, the additive in the surplus electrolyte (that has been accumulated in the peripheral space around the battery element) can be reduced and decomposed to form an additive-derived coating film on the expansion-developed active surface. This leads to improvements of various battery characteristics because, even if the additive-derived coating film formed during the initial charging becomes cracked so that the new expansion-developed active surface appears through the crack, the additive-derived coating film can be again formed to protect the new expansion-developed active surface.

Examples

A positive electrode material was produced as follows. A slurry was prepared by uniformly dispersing a powder of spinel compound $Li_{1.1}Mn_{1.9}O_4$, a powder of lithium-nickel-cobalt-manganese composite oxide, polyvinylidene fluoride as a binder and a powder of carbon black as a conductive aid at a predetermined ratio in a solvent of N-methyl-2-pyrrolidone (NMP). An aluminum foil sheet of 20 μm thickness was provided as a positive electrode collector. A positive electrode active material layer was formed on one side of the positive electrode collector by applying the prepared slurry to the positive electrode collector, evaporating the NMP from the applied slurry and then pressing the resulting positive electrode active material coating. A positive electrode active material layer was also formed on the other side of the positive electrode collector in the same manner as above.

A negative electrode material was produced as follows. A slurry was prepared by uniformly dispersing a powder of spherical natural graphite particles (average particle size 20 μm) coated with amorphous carbon as a negative electrode active material and carbon black as a conductive aid at a predetermined ratio in an aqueous solution of styrene-butadiene rubber and carboxymethylcellulose as a binder. A copper foil sheet of 15 μm thickness was provided as a negative electrode collector. A negative electrode active material layer was formed on one side of the negative electrode collector by applying the prepared slurry to the negative electrode collector, evaporating water from the applied slurry and then pressing the resulting negative electrode active material coating. A negative electrode active material layer was also formed on the other side of the negative electrode collector in the same manner as above.

The produced positive and negative electrode materials were cut into predetermined sizes, thereby forming positive and negative electrode plates with no active materials applied to collector extension parts thereof. Further, separators was formed from polyethylene and polypropylene. A predetermined number of the positive and negative electrode plates and the separators were alternately stacked together such that the active material layers of the positive electrode plates faced the active material layers of the negative electrode plates via the separators, respectively.

A negative electrode terminal was joined at an inner end portion (one end portion) thereof to the collector extension parts of the negative electrode plates. Similarly, a positive electrode terminal was joined at an inner end portion (one end portion) thereof to the collector extension parts of the positive electrode plates. Laminate film sheets were provided as a material of an exterior member. While the above-obtained battery element was covered by the laminate film sheets, four peripheral sides of the laminate film sheets were bonded together by thermal fusion bonding with a relatively small injection port remaining open. The following electrolyte was injected into the inside of the exterior member through the injection port. The inside of the exterior member was depressurized. Then, the exterior member was sealed by thermally fusing the injection port. The thermal fusion bonding of the laminate film sheets was performed with the positive and negative electrode terminals being led out from one of the four sides of the laminate film sheets. The distance between the thermal fusion part and the battery element was set to: 15 mm at the side from which the terminals were led out; and 5 mm at the other sides.

The electrolyte used was prepared by dissolving $LiPF_6$ at 1 mol/L in a mixed solvent of ethylene carbonate and diethyl carbonate (volume ratio 3:7). A predetermined amount of vinylene carbonate was added to the electrolyte for each sample. There were thus obtained battery samples S1 to S7 (as Examples 1 to 7) and battery samples P1 and P2 (as Comparative Examples 1 and 2), three samples (or two samples) for each sample type, as shown in FIGS. 1 and 2.

Each of the battery samples was subjected to initial charging with the application of pressure to the battery from the outside of the exterior member 5 by a pressure application means (having press plates 61 formed of stainless steel) as shown in FIG. 3 (in the case of the battery sample P1, initial charging was performed with the application of no pressure) under the respective sample conditions. The thus-produced battery samples were tested for the amount (ppm) of the additive remaining in the electrolyte within the inside of the exterior member 5 after the initial charging, the cycle-test capacity retention rate (more specifically, the capacity retention rate (%) after 500 test cycles at 45° C.) and the storage-test resistance increase rate (more specifically, the resistance increase rate (%) after being left at 45° C. for 16 weeks).

The electrolyte amount (i.e. the total amount of the electrolyte relative to the pore volume of the battery element (in terms of ratio)), the additive amount (wt %), the applied pressure (MPa) and the battery thickness (in terms of ratio) of the respective samples are shown in TABLE 1.

TABLE 1

| | | Example 1 Sample S1 | Example 2 Sample S2 | Example 3 Sample S3 | Example 4 Sample S4 | Example 5 Sample S5 |
|---|---|---|---|---|---|---|
| Conditions | Ratio of volume of electrolyte to pore volume of battery element (volume ratio) | 1.35 | 1.35 | 1.35 | 1.2 | 1.2 |
| | Additive amount (wt %) | 3 | 3 | 3 | 5 | 7 |

TABLE 1-continued

|  |  |  |  |  |  |  |
|---|---|---|---|---|---|---|
|  | Applied pressure (MPa) | 0.049 | 0.0049 | 0.245 | 0.245 | 0.127 |
|  | Ratio of thickness of battery to thickness of battery element (thickness ratio) | 1.03 | 1.05 | 1.02 | 1.02 | 1.03 |
| Test results | Remaining additive amount (ppm) | 5400 | 3300 | 6259 | 4900 | 4000 |
|  | Capacity retention rate after 500 test cycles at 45° C. | 86 | 80 | 87 | 85 | 82 |
|  | Resistance increase rate after left at 45° C. for 16 weeks | 1.01 | 1.13 | 1.02 | 1.02 | 1.09 |

|  |  | Example 6 Sample S6 | Example 7 Sample S7 | Comparative Example 1 Sample P1 | Comparative Example 2 Sample P2 |
|---|---|---|---|---|---|
| Conditions | Ratio of volume of electrolyte to pore volume of battery element (volume ratio) | 1.6 | 1.6 | 2 | 1.5 |
|  | Additive amount (wt %) | 1.5 | 3 | 1 | 0 |
|  | Applied pressure (MPa) | 0.098 | 0.0098 | no pressure | 0.147 |
|  | Ratio of thickness of battery to thickness of battery element (thickness ratio) | 1.03 | 1.07 | 1.21 | 1.03 |
| Test results | Remaining additive amount (ppm) | 3163 | 4745 | 920 | 0 |
|  | Capacity retention rate after 500 test cycles at 45° C. | 80 | 84 | 73 | 70 |
|  | Resistance increase rate after left at 45° C. for 16 weeks | 1.1 | 1.04 | 1.3 | 1.4 |

As shown in TABLE 1, each of the battery samples P1 and P2 of Comparative Examples had a low cycle-test capacity retention rate and a high resistance increase rate. The reason for this is assumed as follows. In the case of the battery sample P1, the electrolyte was used in a relatively large amount (including the surplus electrolyte). However, the initial charging was performed with the application of no pressure. The battery sample was large in thickness as most of the electrolyte including the surplus electrolyte was kept contained in the battery element. Most of the additive was thus consumed by reduction and decomposition before the completion of the initial charging (i.e. the remaining additive was present in a relatively small amount of 920 ppm) so that, even though the additive-derived coating film was formed on the active surface of the negative electrode active material before the expansion, almost no additive-derived coating film was formed on the expansion-developed active surface of the negative electrode active material after the expansion. In the battery sample P2, no additive was contained in the electrolyte. Only the electrolyte-derived coating film was formed on the active surface of the negative electrode active material although the initial charging was performed with the application of pressure.

On the other hand, the battery samples S1 to S7 each had a higher cycle-test capacity retention rate and a lower resistance increase rate than those of the battery samples P1 and P2 of Comparative Examples. The reason for this is assumed as follows. As the electrolyte was used in a relatively large amount (including the surplus electrolyte) and as the initial charging was performed with the application of pressure, the surplus electrolyte was shifted to the inner peripheral space 5b of the exterior member 5 so that the additive remained in a large amount (e.g. 3000 ppm or more as in the battery samples S1 to S7) in the electrolyte within the peripheral space 5b after the initial charging. Thus, the additive-derived coating film was formed sufficiently on the active surface, including the expansion-developed active surface, by the effective use of the remaining additive after the initial charging e.g. during the cycle test or storage test. The above assumed mechanism is also supported by the test results that the battery samples S1, S2, S3 and S5 of Examples had a tendency to show a higher cycle characteristics and a lower resistance increase rate as the remaining additive amount decreased.

It was further confirmed that, when the battery sample P1 was subjected to initial charging with the application of pressure in the same manner as the battery samples S1 to S7, the additive remained in a large amount within the inside of the exterior member 5 after the initial charging so that the life characteristics of the battery sample was improved.

Although the present invention has been described with reference to the above specific embodiment and examples, it is apparent to those skilled in the art that; various modifications and variations can be made without departing from the technical spirit of the present invention; and these modifications and variations are also included in the scope of the present invention.

For example, the battery element may alternatively be of flat winding type although the battery element is formed into a flat shape by alternately stacking a predetermined number of positive and negative electrode plates via separators in the above embodiment. In this case, the electrolyte is extruded in a winding axial direction with the application of pressure to a flat surface of the battery element in which an excessive amount of electrolyte is contained. It is possible even in such a configuration to obtain the effects of the present invention.

The invention claimed is:

1. A manufacturing method of a non-aqueous electrolyte secondary battery, comprising:
    assembling the non-aqueous electrolyte secondary battery by accommodating a flat battery element together with a non-aqueous electrolyte and at least one kind of electrolyte additive in a film-like exterior member, the battery element having a positive electrode plate and a negative electrode plate stacked together via a separator, the non-aqueous electrolyte including a surplus electrolyte;

in a state where pressure is applied to a flat surface of the battery element from the outside of the exterior member, subjecting the non-aqueous electrolyte secondary battery to a charging operation including at least initial charging; and after the charging operation, releasing the non-aqueous electrolyte secondary battery from the applied pressure, such that the surplus electrolyte is shifted to between the electrode plates of the battery element, wherein the applied pressure during the charging operation including at least initial charging is $0.98 \times 10^{-2}$ MPa to $24.5 \times 10^{-2}$ MPa;

wherein an amount of the electrolyte additive contained in the non-aqueous electrolyte is 3 wt % to 7 wt %;

wherein the electrolyte additive is reduced and decomposed on a negative electrode active material of the negative electrode plate to form a coating film; and wherein an amount of the electrolyte additive remaining in the non-aqueous electrolyte after the charging operation including at least initial charging is 4000 ppm to 6259 ppm.

2. The manufacturing method of the non-aqueous electrolyte secondary battery according to claim 1, wherein a thickness of the outer shape of the non-aqueous electrolyte secondary battery under the application of the pressure is in a range of 1.02 to 1.07 times a thickness of the battery element in a stacking direction thereof.

3. The manufacturing method of the non-aqueous electrolyte secondary battery according to claim 1, wherein an amount of the non-aqueous electrolyte used is 1.1 to 1.6 times as much as a pore volume of the battery element.

* * * * *